United States Patent
Jin

(10) Patent No.: US 11,036,559 B2
(45) Date of Patent: Jun. 15, 2021

(54) GRAPHICS PROCESSOR AND GRAPHICS PROCESSING METHOD BASED ON SUBDIVIDED STATES

(71) Applicant: SAMSUNG ELECTRONICS CO., LTD., Suwon-si (KR)

(72) Inventor: Seung-hun Jin, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 16/515,445

(22) Filed: Jul. 18, 2019

(65) Prior Publication Data
US 2020/0142749 A1    May 7, 2020

(30) Foreign Application Priority Data
Nov. 6, 2018  (KR) .................. 10-2018-0135326

(51) Int. Cl.
| | | |
|---|---|---|
| *G06F 9/50* | (2006.01) | |
| *G06T 1/60* | (2006.01) | |
| *G06T 1/20* | (2006.01) | |
| *G06F 9/38* | (2018.01) | |

(52) U.S. Cl.
CPC .......... *G06F 9/5066* (2013.01); *G06F 9/3857* (2013.01); *G06F 9/3877* (2013.01); *G06T 1/20* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 7,404,056 | B1 * | 7/2008 | Nordquist | .............. G06F 9/384 711/162 |
| 7,948,498 | B1 * | 5/2011 | Minkin | ..................... G06T 1/60 345/552 |
| 9,092,267 | B2 | 7/2015 | Arvo | |
| 9,679,346 | B2 | 6/2017 | Begeman et al. | |
| 9,830,134 | B2 | 11/2017 | Howes | |
| 2006/0005097 | A1 * | 1/2006 | Ichikawa | ............ G06F 11/3404 714/745 |
| 2008/0094403 | A1 * | 4/2008 | Bakalash | .............. G06F 9/5066 345/505 |

(Continued)

FOREIGN PATENT DOCUMENTS

| | | |
|---|---|---|
| KR | 10-2017-0015232 A | 2/2017 |
| KR | 10-2017-0031480 A | 3/2017 |

(Continued)

*Primary Examiner* — Joni Hsu
(74) *Attorney, Agent, or Firm* — Lee IP Law, PC

(57) ABSTRACT

A graphics processor including a plurality of computational units includes a first computational unit including a plurality of sub-units and a state table that stores states of the plurality of sub-units, and a state manager that updates the state table in response to a first command and designates a state combination of the states stored in the state table in response to a second command. The state table includes a plurality of sub-tables respectively corresponding to sub-units of the plurality of sub-units, each sub-table including a row that designates the state combination of the states for each corresponding sub-unit. The state manager designates one of rows included in each of the plurality of sub-tables as the state combination of the states.

20 Claims, 10 Drawing Sheets

(56) References Cited

U.S. PATENT DOCUMENTS

| | | | |
|---|---|---|---|
| 2011/0242115 A1* | 10/2011 | Tsao | G06T 1/20 |
| | | | 345/522 |
| 2015/0123980 A1* | 5/2015 | Nalluri | G06T 1/20 |
| | | | 345/522 |
| 2017/0032488 A1 | 2/2017 | Nystad | |
| 2017/0076418 A1 | 3/2017 | Son et al. | |
| 2018/0101929 A1 | 4/2018 | Jin et al. | |

FOREIGN PATENT DOCUMENTS

| | | |
|---|---|---|
| KR | 10-1752062 B1 | 6/2017 |
| KR | 10-1862981 B1 | 5/2018 |

* cited by examiner

ST51

| VER | States | | |
|---|---|---|---|
| | SU1 | SU2 | SU3 |
| V1 | A | B | C |
| V2 | A | B' | C |
| V3 | A | B'' | C |
| V4 | A' | B | C' |
| V5 | A' | B''' | C |
| V6 | A | B | C'' |

ST52

| VER | States | | | | |
|---|---|---|---|---|---|
| | SU4 | SU5 | SU6 | SU7 | SU8 |
| V1 | D | E | F | G | H |
| V2 | D | E | F' | G | H |

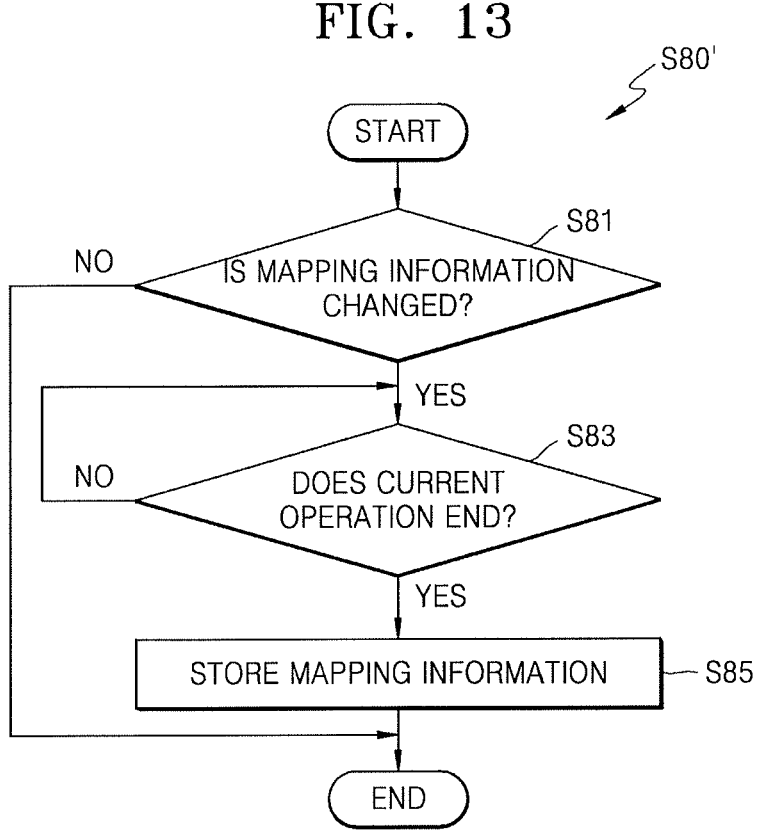
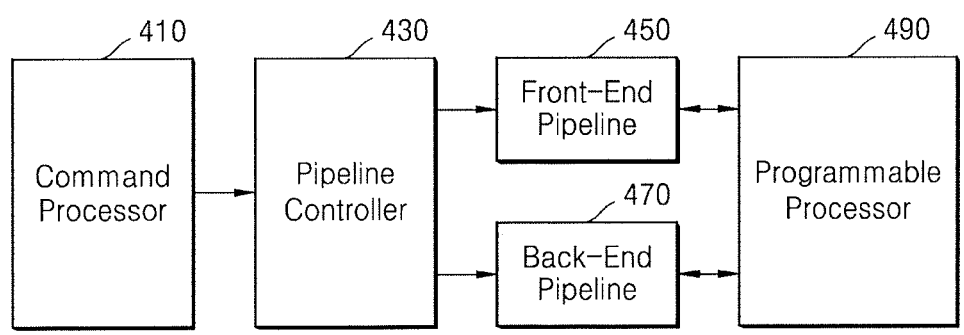

GRAPHICS PROCESSOR AND GRAPHICS PROCESSING METHOD BASED ON SUBDIVIDED STATES

CROSS-REFERENCE TO RELATED APPLICATION

Korean Patent Application No. 10-2018-0135326, filed on Nov. 6, 2018, in the Korean Intellectual Property Office, and entitled: "Graphics Processor and Graphics Processing Method Based on Subdivided States," is incorporated by reference herein in its entirety.

BACKGROUND

1. Field

Embodiments relate to graphics processing, and more particularly, to a graphics processor and a graphics processing method each based on subdivided states.

2. Description of the Related Art

Rendering is a process of generating an image from a three-dimensional (3D) model or a two-dimensional (2D) model in a predetermined viewpoint. As the demand for computer graphics increases, a graphics processing system may be used as special-purpose hardware for accelerating rendering. In a computing system including the graphics processing system, a rendering process may be referred to as a graphics pipeline.

The graphics processing system may include a plurality of computational units and may include a memory that stores data provided to or generated by each of the computational units. The computational units may start to perform an operation after being set to a certain state, based on a command provided from the outside e.g. a host) of the graphics processing system. Therefore, to enhance the performance of the graphics pipeline, efficiently setting states of plurality of computational units is needed.

SUMMARY

One or more embodiments provide a graphics processor including a plurality of computational units, the graphics processor including a first computational unit having a plurality of sub-units and a state table that stores states of the plurality of sub-units, and a state manager that updates the state table in response to a first command and designates a state combination of the states stored in the state table in response to a second command. The state table includes a plurality of sub-tables respectively corresponding to sub-units of the plurality of sub-units, each sub-table including a row that designates the state combination of states for each corresponding sub-unit. The state manager designates one of rows included in each of the plurality of sub-tables as the state combination of the states.

One or more embodiments provide a graphics processor including a plurality of computational units, the graphics processor including a first computational unit including a state table that stores a plurality of sub-units and states of the plurality of sub-units and a state manager that updates the state table in response to a first command and designates a state combination of the states stored in the state table in response to a second command. The first computational unit may further include a mapping table that maps the plurality of sub-units to fields of the state table.

One or more embodiments provide a graphics processing method based on a plurality of computational units, the graphics processing method including, in response to a first command, updating a state table storing states of a plurality of sub-units included in a computational unit and, in response to a second command, designating a state combination of the states stored in the state table. Designating the state combination includes designating one row of a first sub-table included in the state table and designating one row of a second sub-table included in the state table, wherein rows in the first and second sub-tables designate the state combination of the states for each sub-unit therein.

BRIEF DESCRIPTION OF THE DRAWINGS

Features will become apparent to those of skill in the art by describing in detail exemplary embodiments with reference to the attached drawings in which:

FIG. 13 illustrates a flowchart of an example of operation S80 of FIG. 9 according to an exemplary embodiment; and FIG. 14 illustrates a graphics processor according to an exemplary embodiment.

DETAILED DESCRIPTION

Figure 1:
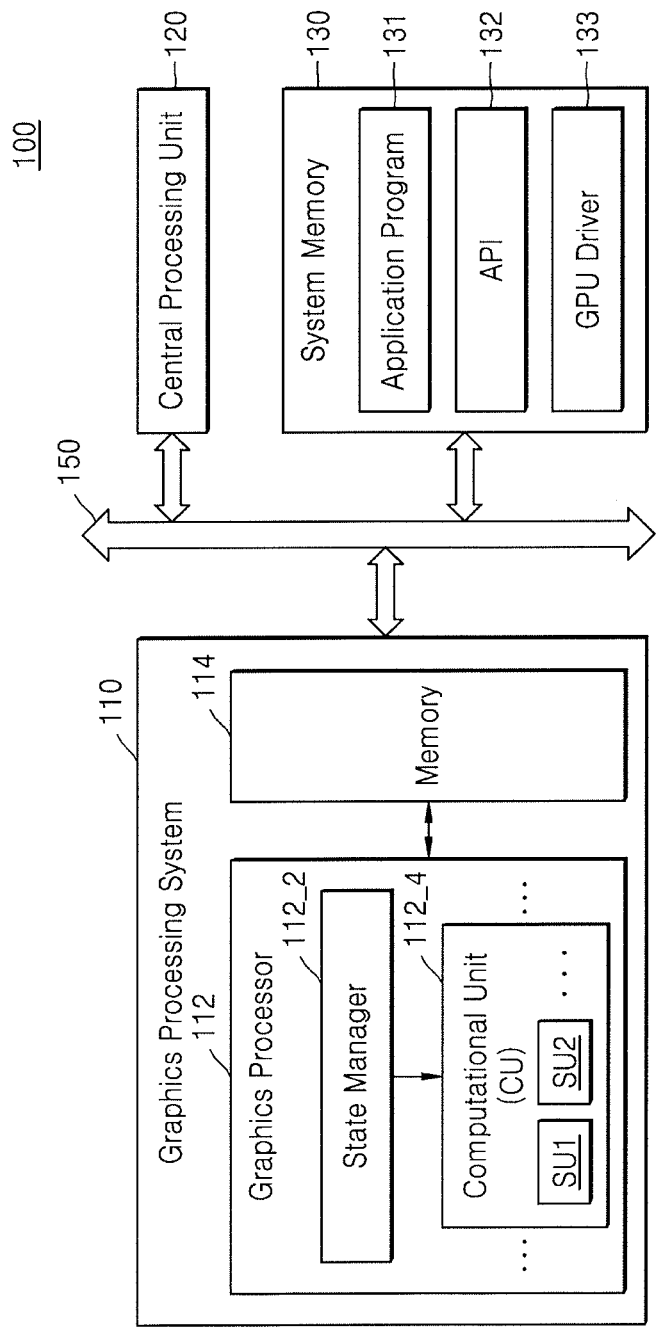
FIG. 1 illustrates a computing system according to an exemplary embodiment.

FIG. 1 illustrates a computing system 100 according to an exemplary embodiment. The computing system 100 may be an arbitrary computing system including a graphics processing system 110. For example, the computing system 100 may be a stationary computing system, e.g., a desktop computer, a server, a television set-top box, a videogame console, and the like, or may be a portable computing system, e.g., a laptop computer, a mobile phone, a wearable device, a portable media player, a tablet personal computer (PC), an e-book reader, and the like.

As illustrated in FIG. 1, the computing system 100 may include the graphics processing system 110, a central processing unit (CPU) 120, a system memory 130, and a system bus 150. In some embodiments, two or more elements included in the computing system 100 may be integrated into a single processing system. The system bus 150, as illustrated in FIG. 1, may connect the graphics processing system 110, the CPU 120, and the system memory 130. The graphics processing system 110, the CPU 120, and the system memory 130 may communicate with one another through the system bus 150. In some implementations, the system memory 130 may be directly connected to the CPU 120.

The CPU 120 may execute a series of instructions (or programs) stored in the system memory 130 and may process data stored in the system memory 130. Also, the CPU 120 may allow the graphics processing system 110 to perform a certain operation in a graphics pipeline and may be referred to as a host of the graphics processing system 110. In some implementations, the CPU 120 may include two or more cores.

The system memory 130 may store the instructions and the data to be processed by the CPU 120 and the graphics processing system 110. The system memory 130 may include an arbitrary type of memory which stores information. In some implementations, the system memory 130 may include a volatile memory, e.g., dynamic random access memory (DRAM), static random access memory (SRAM), mobile DRAM, double data rate synchronous dynamic random access memory (DDR SDRAM), low power DDR (LPDDR) SDRAM, graphics DDR (GDDR) SDRAM, Rambus dynamic random access memory (RDRAM), and the like. In some implementations. the system memory 130 may include a non-volatile memory, e.g., electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), ferroelectric random access memory (FRAM), and the like.

As illustrated in FIG. 1, the system memory 130 may include an application program 131, an application program interface (API) 132, and a graphics processing unit (GPU) driver 133. The application program 131 may generate calls to the API 132 so as to generate desired results, e.g., in the form of a sequence of graphics images. The application program 131 may provide the API 132 with high-level shading programs which are to be processed by the GPU driver 133. The high-level shading programs may include source codes of high-level programming instructions designed to operate one or more programmable processors (e.g. a shading engine) in the graphics processing system 110. In some embodiments, the API 132 may be provided in the GPU driver 133. The GPU driver 133 may translate the high-level shading programs into machine code shading programs optimized for a type of a shading engine (e.g. a vertex, a geometry, or a fragment). Herein, an operation of CPU 120 by executing each of the application program 131, the API 132, and the GPU driver 133 may be referred to as an operation performed by each of the application program 131, the API 132, and the GPU driver 133. Thus, each of the application program 131, the API 132, and the GPU driver 133 may be referred to as a host of the graphics processing system 110 (or a graphics processor 112).

The graphics processing system 110 may receive instructions provided by the CPU 120 and may process the received instructions so as to allow a display apparatus to render and display images. As illustrated in FIG. 1, the graphics processing system 110 may include the graphics processor 112 and a memory 114, and may be referred to as a graphics processing subsystem. The graphics processor 112 may be connected to the memory 114 through a bus (e.g. a GPU bus). The graphics processor 112 may store data generated in the middle of processing instructions received from the CPU 120 in the memory 114 and may allow the display apparatus to display final images stored in the memory 114.

The graphics processor 112 may include a state manager 112_2 and a plurality of computational units. A computational unit included in the graphics processor 112 may be referred to as a hardware block to perform a predefined function depending on a set state. The state manager 112_2 may manage states of the plurality of computational units based on a command received from a host. For example, as illustrated in FIG. 1, the graphics processor 112 may include a computational unit 112_4, and the computational unit 112_4 may include a plurality of sub-units SU1, SU2, . . . .

The state manager 112_2 may set a state of a computational unit 112_4 (i.e., states of a plurality of sub-units SU1, SU2, . . . included in the computational unit 112_4), based on the command received from the host (i.e., the CPU 120). The host may provide computational units, which have been set to desired states, with a command for triggering an operation, and the computational units may perform predefined functions, based on their states.

The computational unit 112_4, as described below with reference to FIG. 2, may include a state table (e.g. 222 of FIG. 2) which stores combinations of states of the plurality of sub-units SU1, SU2, . . . . In transmitting the command for triggering the operation, the host may transmit an identifier (ID) corresponding to a combination (i.e., a state combination) of states which are to be set in the plurality of sub-units SU1, SU2, . . . of the computational unit 112_4. Thus, a state of the computational unit 112_4 may be prevented from being frequently transmitted from the host to the graphics processor 112. One row of the state table may correspond to a combination (i.e., one state combination) of states of a plurality of sub-units SU1, SU2, . . . , and a single state combination may be referred to as a state version. Therefore, the state table including a plurality of rows may include a plurality of state versions. However, as described below with reference to FIGS. 3A and 3B, due to a limited size of the state table, when the number of state combinations (i.e., state versions) needed for a computational unit increases or a similarity between the state combinations is high, inefficiency may occur in setting a state of a computational unit.

In some embodiments, states of the plurality of sub-units SU1, SU2, . . . of the computational unit 112_4 may be subdivided. For example, as described below with reference to the drawings, the state table of the computational unit 112_4 may include two or more sub-tables, and the states of the plurality of sub-units SU1, SU2, . . . may be expressed as a combination of rows included in the two or more sub-tables. Therefore, a state of the computational unit 112_4 (i.e., the states of the plurality of sub-units SU1, SU2, . . . ) may be efficiently set, and traffic for setting a state of the computational unit 112_4 between the host and the graphics processor 112 may decrease, thereby considerably improving the performance of the graphics pipeline. Also, a storage space (i.e., a size of the state table) for storing the states of the computational unit 112_4 may decrease. Thus, a level of difficulty in process and an area of the graphics processor 112 may decrease and/or additional computational units may be provided in a secured area, thereby further enhancing the performance of the graphics processor 112.

The graphics processor 112 may include a plurality of programmable processors for simultaneously executing a plurality of threads, in addition to a plurality of functional units which perform a predetermined function depending on a set state. Each of the programmable processors may be programmed to perform various operations, and some multiprocessors may each function as a shading engine including one or more programmable shaders.

Figure 2:
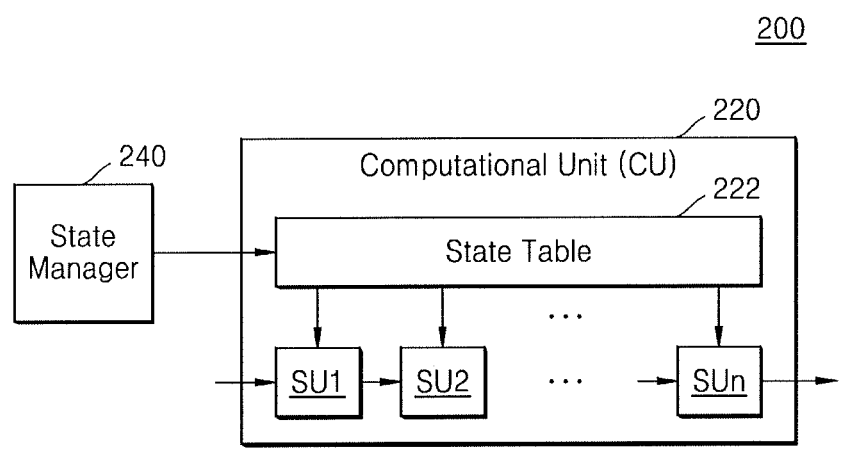
FIG. 2 illustrates a graphics processor according to an exemplary embodiment.

FIG. 2 illustrates a graphics processor 200 according to an exemplary embodiment. In detail, FIG. 2 illustrates a graphics processor 200 including one computational unit 220 of a plurality of computational units and a state manager 240. As described above with reference to FIG. 1, the state manager 240 may set a state of the computational unit 220, based on a command of a host.

Referring to FIG. 2, the computational unit 220 may include a state table 222 and a plurality of sub-units SU1 to SUn (where n is an integer greater than one). As described above with reference to FIG. 1, each of the plurality of sub-units SU1 to SUn may be set to a certain state and may perform a predefined function based on the set state. For example. when the computational unit 220 is to perform an input assembly (IA), the plurality of sub-units SU1 to SUn may respectively perform sequential operations for performing the IA based on set states. A state of each of the plurality of sub-units SU1 to SUn may include, e.g., an address pointer indicating an area storing data which is to be processed and a resultant primitive attribute. Hereinafter, the computational unit 220 designed to perform the IA will be mainly described as an example.

The state table 222 may store states of the plurality of sub-units SU1 to SUn. The state table 222 may include an arbitrary structure for storing information and may include a volatile memory device, e.g., an SRAM cell, a DRAM cell, a register, a latch, a flip flop, and the like. Each of the plurality of sub-units SU1 to SUn may be set to one of a plurality of state combinations stored in the state table 222. As described below with reference to FIG. 4, the state table 222 may include two or more sub-tables. The sub-tables may respectively correspond to different sub-units and each of the sub-tables may include states of corresponding sub-units.

The state manager 240 may control the state table 222. In some embodiments, the state manager 240 may update the state table 222 in response to a first command received from the host (e.g. 120 of FIG. 1). For example, the first command may accompany states to be stored in the state table 222 and the state manager 240 may store the states, accompanied by the first command, in the state table 222. Also, in some embodiments. the state manager 240 may set each of the plurality of sub-units SU1 to SUn to one of the combinations of the states stored in the state table 222 in response to a second command received from the host. To this end, the state manager 240 may designate one of the state combinations included in the state table 222. As described above, the state table 222 may include two or more sub-tables. Thus, the state manager 240 may designate a row of each of the two or more sub-tables to specify a state combination. Therefore, problems described below with reference to FIGS. 3A and 3B may be solved, and states of the plurality of sub-units SU1 to SUn may be efficiently set.

Figure 3A:
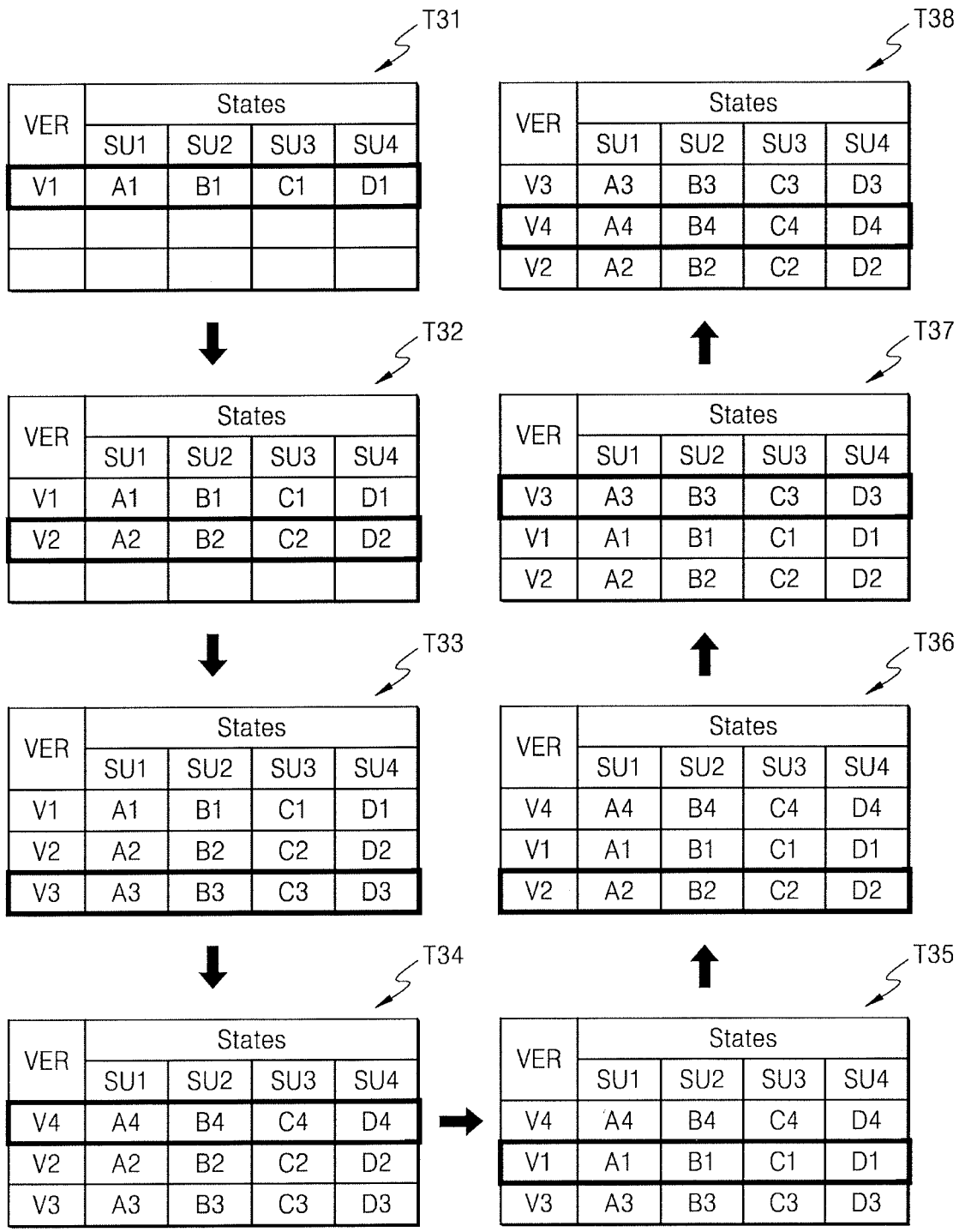
FIGS. 3A and 3B illustrate examples of state tables according to comparative examples.
Figure 3B:
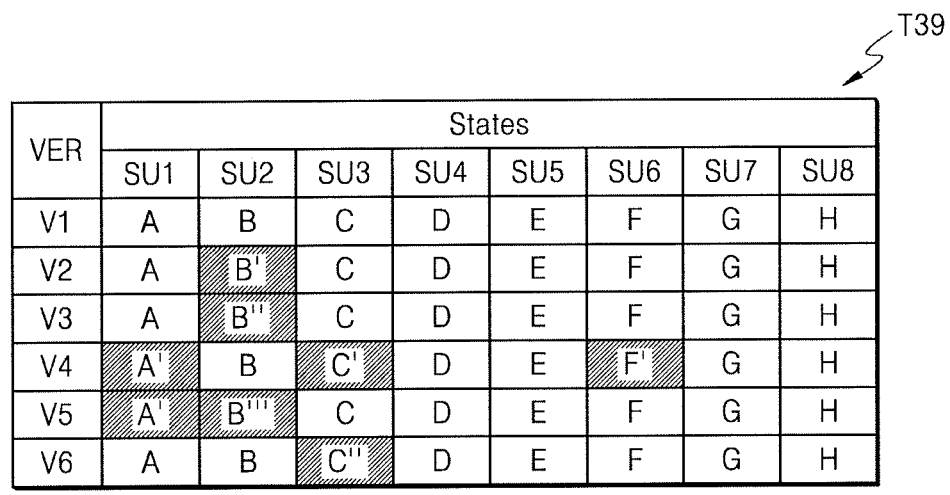

FIGS. 3A and 3B are examples of state tables according to comparative examples. In detail, FIGS. 3A and 3B illustrate state tables included in one computational unit. In FIG. 3A, a computational unit may be assumed as having four sub-units SU1 to SU4. In FIG. 3B, a computational unit may be assumed as having eight sub-units SU1 to SU8.

Referring to FIG. 3A, a state table may include three rows for storing three state versions and four fields respectively corresponding to the four sub-units SU1 to SU4, and the state versions may be changed by a host in the order of 1-2-3-4-1-2-3-4. Therefore, as in a state table T31, a first state version V1 corresponding to states {A1, B1, C1, D1} of the four sub-units SU1 to SU4 may be added. Similarly, as in a state table T32 and a state table T33, a second state version V2 corresponding to states {A2, B2, C2, D2} and a third state version V3 corresponding to states {A3, B3, C3, D3} may be sequentially added.

The state table T33 may include three rows. Thus, in order to add a fourth state version V4 subsequent thereto, a state table T34 may replace the first state version V1 included in the state table T33 with the fourth state version V4. Similarly, a state table 135 may replace the second state version V2 included in the state table T34 with the first state version V1, and a state table T36 may replace the third state version V3 included in the state table 135 with the second state version V2. Also, a state table T37 may replace the fourth state version V4 included in the state table T36 with the third state version V3, and a state table T38 may replace the first state version V1 included in the state table T37 with the fourth state version V4.

In FIG. 3A, a state version may be replaced whenever a state version is changed from the state table T34. Thus, the performance of a graphics pipeline may be reduced. A problem shown in FIG. 3A may not occur in a state table that has four rows, but a size of a state table may be limited by a size of a computational unit and may be determined in a process of designing a graphics processor (e.g. 131 of FIG. 1), whereby the same problem may still occur based on the number of state versions used in the host (e.g. an application program (e.g. 131 of FIG. 1)). Accordingly, a size of a state table may need to be decreased or state table having a predetermined size may need to be efficiently used.

Referring to FIG. 3B, a state table T39 may include six rows, and the six rows may respectively store six state versions (e.g. first to sixth state versions) V1 to V6. As shown in FIG. 3B, state versions, which have different states corresponding to one sub-unit, may be included as different rows in the state table T39. Only different states between versions are highlighted in the state table T39. For example, in the first state version V1 and the second state version V2, only states B and B' of a second sub-unit SU2 differ and states of the other sub-units may be the same.

As shown in FIG. 3B, states of a plurality of sub-units included in a computational unit may be changed at different frequencies. For example, in a computational unit for performing an IA, an address pointer indicating an area storing data which is to be processed may be changed relatively frequently as an object is changed, but a primitive attribute may not be changed relatively frequently. Similarly, as shown in FIG. 3B, in the six state versions V1 to V6, first to third sub-units SU1 to SU3 may be set to states which are changed relatively frequently, and fourth to eighth sub-units SU4 to SU8 may be set to states which are not changed relatively frequently. Particularly, each of the fourth to eighth sub-units SU4, SU5, SU6, SU7 and SU8 may be set to a certain state in the six state versions V1 to V6.

Therefore, as discussed in detail below, one or more embodiments are directed to allocating a relatively large storage space to sub-units (e.g., SU1 to SU3) set to states that are frequently changed and a relatively small storage space to sub-units (e.g., SU4 to SU8) set to states that are not frequently changed. Thus, a state table may be efficiently used.

Figure 4:
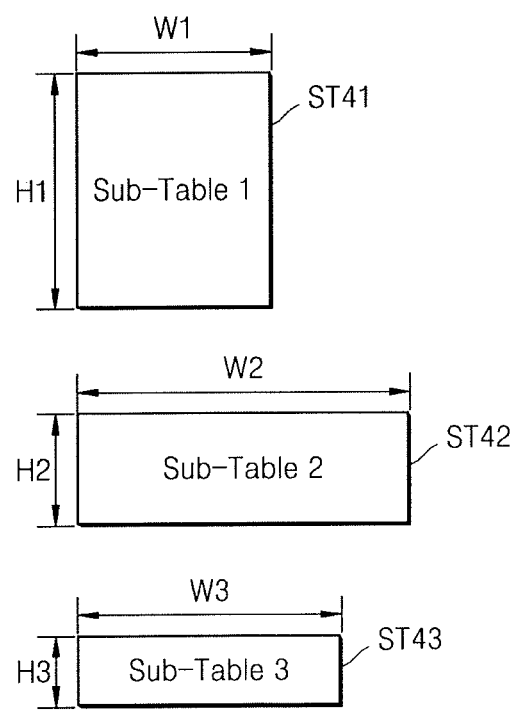
FIG. 4 illustrates examples of a sub-table according to an exemplary embodiment.

FIG. 4 illustrates examples of sub-tables according to an exemplary embodiment. In detail, FIG. 4 illustrates sub-tables (e.g. first to third sub-tables) ST41 to ST43 included in one state table. In some implementations, unlike the illustration of FIG. 4, a state table included in a computational unit may include two sub-tables or four or more sub-tables. In the description of FIG. 4, the sub-tables ST41 to ST43 may be in the state table 222 of FIG. 2 and the computational unit 220 of FIG. 2 may be assumed to include thirteen sub-units (e.g. first to thirteenth) SU1 to SU13. Hereinafter, FIG. 4 will be described with reference to FIG. 2.

In some embodiments, a state table may include a plurality of sub-tables respectively corresponding to different sub-units. For example, in the first to third sub-tables ST41 to ST43 included in the state table 222 of FIG. 2, the first sub-table ST41 may store states of the first to third sub-units SU1 to SU3, the second sub-table ST42 may store states of the fourth to ninth sub-units SU4 to SU9, and the third sub-table ST43 may store states of the tenth to thirteenth sub-units SU10 to SU13. Therefore, as shown in FIG. 4, the first to third sub-tables ST41 to ST43 may have different widths W1 to W3. A width of a sub-table may depend on the number of sub-units (i.e., the number of fields or columns) corresponding to the sub-table and a size of a state (i.e., a size of a field) of each of the sub-units.

In some embodiments, sub-tables included in a state table may include a different number of rows, e.g., where each row indicates different state versions. For example, the first to third sub-tables ST41 to ST43 may have different heights H1 to H3, and a height of a sub-table may depend on the number of rows included in the sub-table (H1>H2>H3). Therefore, in some embodiments, sub-units set to states which are frequently changed may correspond to the first sub-unit ST41 including a largest number of rows, and sub-units set to states which are not frequently changed may correspond to the third sub-unit ST43 including a smallest number of rows.

When a state table includes a plurality of sub-tables, a row of each of the plurality of sub-tables may designate a state combination of states of a plurality of sub-units. Therefore, as described above with reference to FIG. 2, the second command may include a computational unit ID for designating a computational unit and state version IDs corresponding to rows of each of sub-tables. An example which uses a plurality of sub-tables will be described below with reference to FIG. 5.

In some embodiments, sub-tables may be reconfigurable. For example, the state manager 240 may determine the number of sub-tables and a size of each of the sub-tables in response to a command, and the sub-tables may be reconfigured in a storage space allocated to the state table 222. Therefore, the state table 222 may be adapted to a host (e.g. an application program) along with a mapping table (e.g. 624 of FIG. 6) described below with reference to FIG. 6. Thus, an efficiency of a state setting of the computational unit 220 may be enhanced, thereby improving the performance of a graphics pipeline.

Figures 5, 6:
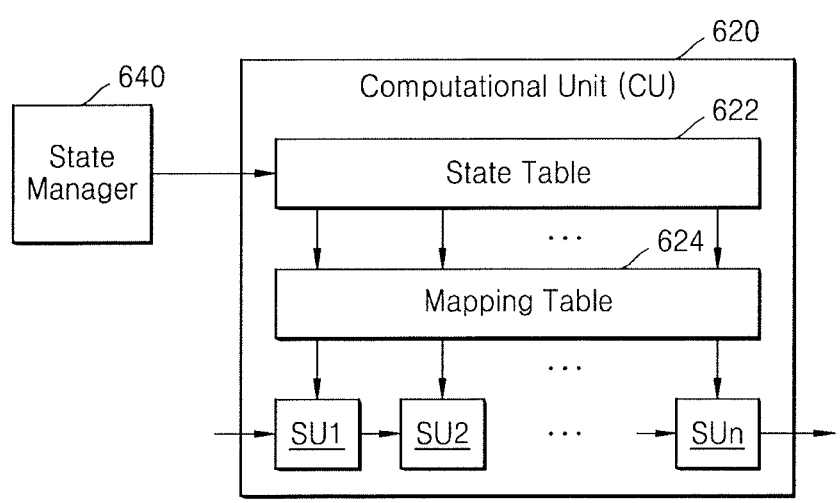
FIG. 5 illustrates examples of a sub-table according to an exemplary embodiment.
FIG. 6 illustrates a graphics processor according to an exemplary embodiment.

FIG. 5 illustrates examples of a sub-table according to an exemplary embodiment. In detail, FIG. 5 shows a first sub-table ST51 and a second sub-table ST52 each performing the same function as that of the state table T39 of FIG. 3B. As described above with reference to FIG. 3B, the first sub-table ST51 and the second sub-table ST52 of FIG. 5 may be included in a computational unit including first to eighth sub-units SU1 to SU8 and may be referred collectively to as one state table. Hereinafter, FIG. 5 will be described with reference to FIG. 3B.

Referring to FIG. 5. the first sub-table ST51 and the second sub-table ST52 may have different sizes. That is. the first sub-table ST51 may include three fields or columns corresponding to the first to third sub-units SU1 to SU3 and six rows, and the second sub-table ST52 may include five fields or columns corresponding to the fourth to eighth sub-units SU4 to SU8 and two rows. That is, as described above with reference to FIG. 3B, states of the first to third sub-units SU1 to SU3 which are changed relatively frequently may be stored in the first sub-table ST51, and states of the fourth to eighth sub-units SU4 to SU8 which are not changed relatively frequently may be stored in the second sub-table ST52.

As in FIG. 3B, a second command, which designates a state of a computational unit including a state table as a single table, may be expressed as Draw(x, y). In this case, x may represent a computational unit ID and y may represent a state version ID. For example, when a computational unit ID of a computational unit including the state table T39 of FIG. 3B is 1 and states of the computational unit are set in the order of the first to sixth state versions V1 to V6, a command sequence "Draw(1, V1)→Draw(1, V2)→Draw(1, V3)→Draw(1, V4)→Draw(1, V5)→Draw(1, V6)" may be received.

As in FIG. 5, a second command, which designates a state of a computational unit including a state table including two sub-tables ST51 and ST52, may be expressed as Draw(x, y, z). In this case, x may represent a computational unit ID, y may represent a state version ID of a state version stored in the first sub-table ST51, and z may represent a state version ID of a state version stored in the second sub-table ST52. When a computational unit ID of a computational unit including the first and second sub-tables ST51 and ST52 of FIG. 5 is 1, a command sequence "Draw(1, V1, V1)→Draw (1, V2, V1)→Draw(1, V3, V1)→Draw(1, V3, V2)→Draw (1, V5, V1)→Draw(1, V6, V1)" may be received for setting a state of a computational unit identically to the above-described command sequence with respect to FIG. 3B. The state table T39 of FIG. 3B may include 48 states, but the first and second sub-tables ST51 and ST52 of FIG. 5 may include a total of 28 states. Therefore, as shown in FIG. 5, a state table including a plurality of sub-tables may be smaller than a state table configured as a single table.

FIG. 6 illustrates a graphics processor 600 according to an exemplary embodiment. In detail, FIG. 6 illustrates a state manager 640 and one computational unit 620 each included in the graphics processor 600. In comparison with the graphics processor 200 of FIG. 2, the computational unit 620 of the graphics processor 600 of FIG. 6 may further include a mapping table 624. Hereinafter, in describing FIG. 6, description given above with reference to FIG. 2 will be omitted.

Referring to FIG. 6, the computational unit 620 may include a state table 622, a mapping table 624, and a plurality of sub-units (e.g. first to $n^{th}$ sub-units) SU1 to SUn (where n is an integer greater than one). As described above with reference to FIG. 3A, states of the plurality of sub-units SU1 to SUn may depend on a host, for example, an application program (e.g. 131 of FIG. 1), and thus, sub-units where states are frequently changed based on the application program may differ. For example, in the embodiments of FIGS. 3B and 5, states that are set in the first to third sub-units SU1 to SU3 may be changed frequently, and states that are set in the fourth to eighth sub-units SU4 to SU8 may not be changed frequently. However, in an embodiment based on another application program, states that are set in the first, sixth, and seventh sub-units SU1, SU6, and SU7 may be changed frequently, and states that are set in the second to fifth and eighth sub-units SU2 to SU5 and SU8 may not be changed frequently. Accordingly, the computational unit 620 may include the mapping table 624, for a variable correspondence relationship between a sub-table and a sub-unit.

The state manager 640 may control the mapping table 624 as well as the state table 622 in response to a command. For example, the state manager 640 may update the mapping table 624 in response to a third command. The state manager 640 may store the mapping information, accompanied by the third command, in the mapping table 624. An example which uses the mapping table 624 will be described below with reference to FIG. 7.

Figure 7:
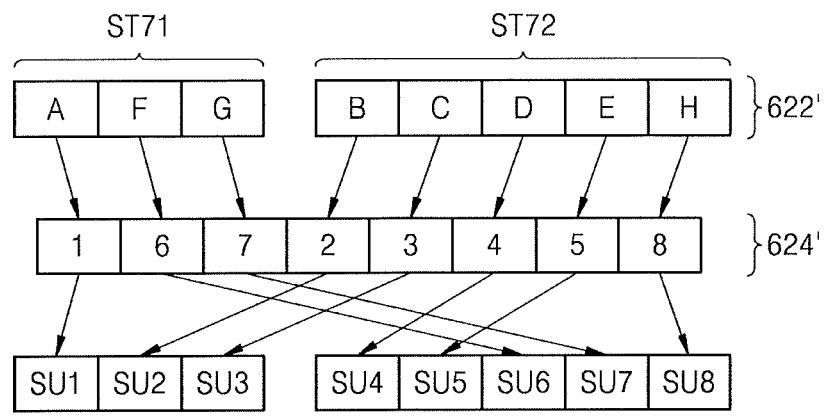
FIG. 7 illustrates an example of a mapping table according to an exemplary embodiment.

FIG. 7 illustrates an example of a mapping table according to an exemplary embodiment. In detail, FIG. 7 illustrates an example state table 622' of the state table 622 of FIG. 6 and an example mapping table 624' of the mapping table 624 of FIG. 6, and in FIG. 7, the computational unit 620 may be assumed as including eight sub-units SU1 to SU8.

As illustrated in FIG. 7, a state table 622' may include first and second sub-tables ST71 and ST72. For convenience of illustration, in the first and second sub-tables ST71 and ST72 of FIG. 7, only states included in one row are illustrated. As in the embodiment of FIG. 5, the first sub-table ST71 may include a relatively large number of rows, for fields or sub-units having states which are changed more frequently, but the second sub-table ST72 may include a relatively small number of rows for fields or sub-units having states which are changed less frequently.

Unlike the embodiments of FIGS. 3A and 5, due to an application program, states set in first, sixth, and seventh sub-units SU1, SU6, and SU7 may be fields or sub-units having states which are changed more frequently, and states set in second to fifth and eighth sub-units SU2 to SU5 and SU8 may not be fields or sub-units having states which are changed more frequently. Therefore, the states of the first, sixth, and seventh sub-units SU1, SU6, and SU7 may be stored in the first sub-table ST71, and the states of the second to fifth and eighth sub-units SU2 to SU5 and SU8 may be stored in the second sub-table ST72. To this end, in a mapping table 624', the first, sixth, and seventh sub-units SU1, SU6, and SU7 may be mapped to the first sub-table ST71, and the second to fifth and eighth sub-units SU2 to SU5 and SU8 may be mapped to the second sub-table ST72. For example, as illustrated by arrows in FIG. 7, entries of the mapping table 624' may sequentially correspond to fields of the first sub-table ST71 and fields of the second sub-table ST72, and each of the entries of the mapping table 624' may include an ID of a sub-unit corresponding to a field of a sub-table corresponding thereto.

As illustrated in FIG. 7, the first three entries of the mapping table 624' respectively corresponding to three fields of the first sub-table ST71 may respectively include values of 1, 6, and 7. Thus, the fields of the first sub-table ST71 may respectively correspond to the first, sixth, and seventh sub-units SU1, SU6, and SU7 and states stored in the first sub-table ST71 may be set in the first, sixth, and seventh sub-units SU1, SU6, and SU7. Similarly, five other entries of the mapping table 624' respectively corresponding to five fields of the second sub-table ST72 may respectively include values of 2, 3, 4, 5 and 7. Thus, the fields of the second sub-table ST72 may respectively correspond to the second to fifth and eighth sub-units SU2 to SU5 and SU8 and states stored in the second sub-table ST72 may be set in the second to fifth and eighth sub-units SU2 to SU5 and SU8.

Figure 8:
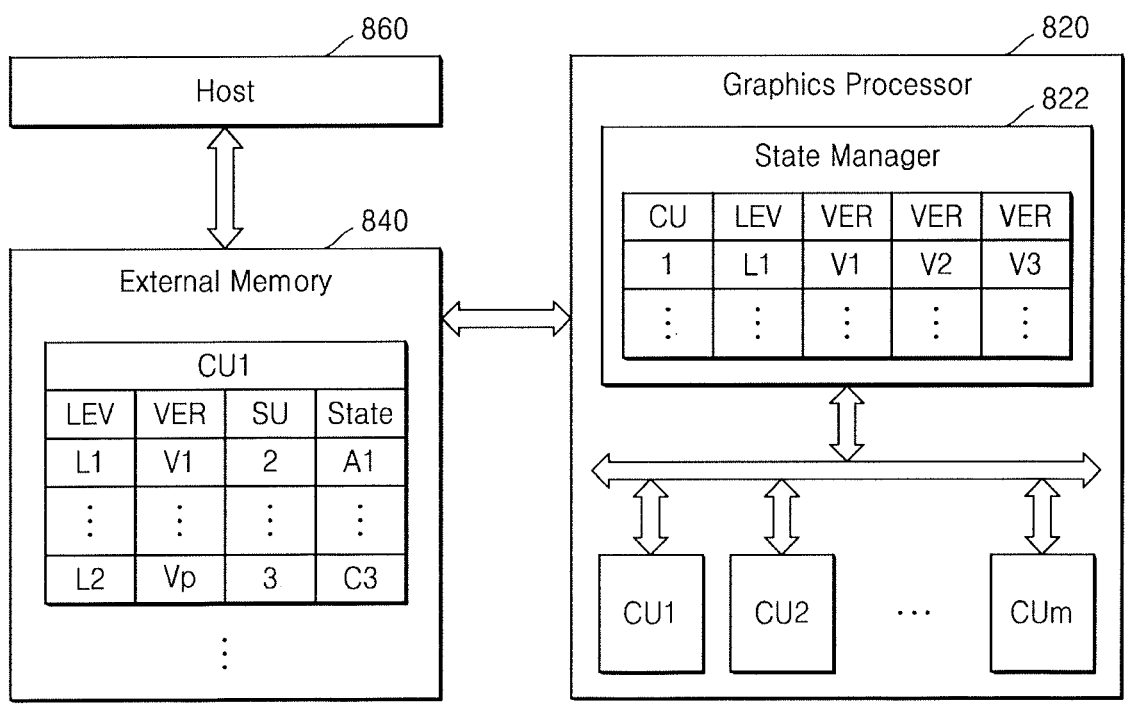
FIG. 8 illustrates a graphics processing system according to an exemplary embodiment.

FIG. 8 illustrates a graphics processing system 800 according to an exemplary embodiment. As illustrated in FIG. 8, the computing system 800 may include a graphics processor 820, an external memory 840, and a host 860. The graphics processor 820 may include a state manager 822 and a plurality of computational units (e.g. first to $m^{th}$ computational units) CU1 to CUm (where m is an integer greater than one). In some embodiments, the graphics processor 820, the external memory 840, and the host 860 of FIG. 8 may respectively correspond to the graphics processor 112, the system memory 130, and the CPU 120 of FIG. 1.

The host 860 (e.g. a GPU driver) may generate state information to be used by the graphics processor 820, based on calls to an API of an application program, and may store the state information in the external memory 840. For example, as illustrated in FIG. 8, the external memory 840 may store state information about the first computational unit CU1. The external memory 840 may store a state of a sub-unit included in a computational unit and may additionally store level information and version information about the stored state. The version information may represent a state version, and the level information may be determined based on a frequency at which a state set in a corresponding sub-unit is changed. For example, in FIG. 8, a state of a first sub-unit SU1 of the first computational unit CU1 may be relatively frequently changed and may be classified as a first level L1, and a state of a third sub-unit SU3 of the first computational unit CU1 may not be relatively frequently changed and may be classified as a second level L2. In some embodiments, level information may correspond to a sub-table. Thus, states of the first sub-unit SU1 may be stored in a sub-table including a relatively large number of rows and states of the third sub-unit SU3 may be stored in a sub-table including a relatively small number of rows.

The state manager 822 may obtain states from the external memory 840 and may provide the obtained states to a corresponding computational unit. The state manager 822 may store level information and version information about each of the states provided to the corresponding computational unit. Only when the corresponding computational unit does not include a state included in the state version, the state manager 822 may provide the state to the corresponding computational unit. For example, as illustrated in FIG. 8, the state manager 822 may store first to third state versions V1 to V3 as version information in the first level L1 of the first computational unit CU1. Therefore, the state manager 822 may recognize that a first sub-table included in the first computational unit CU1 includes the first to third state versions V1 to V3, and based thereon, the state manager 822 may update a state table of the first computational unit CU1 and may designate a row of a first sub-table in response to a command received from the host 860.

Figure 9:
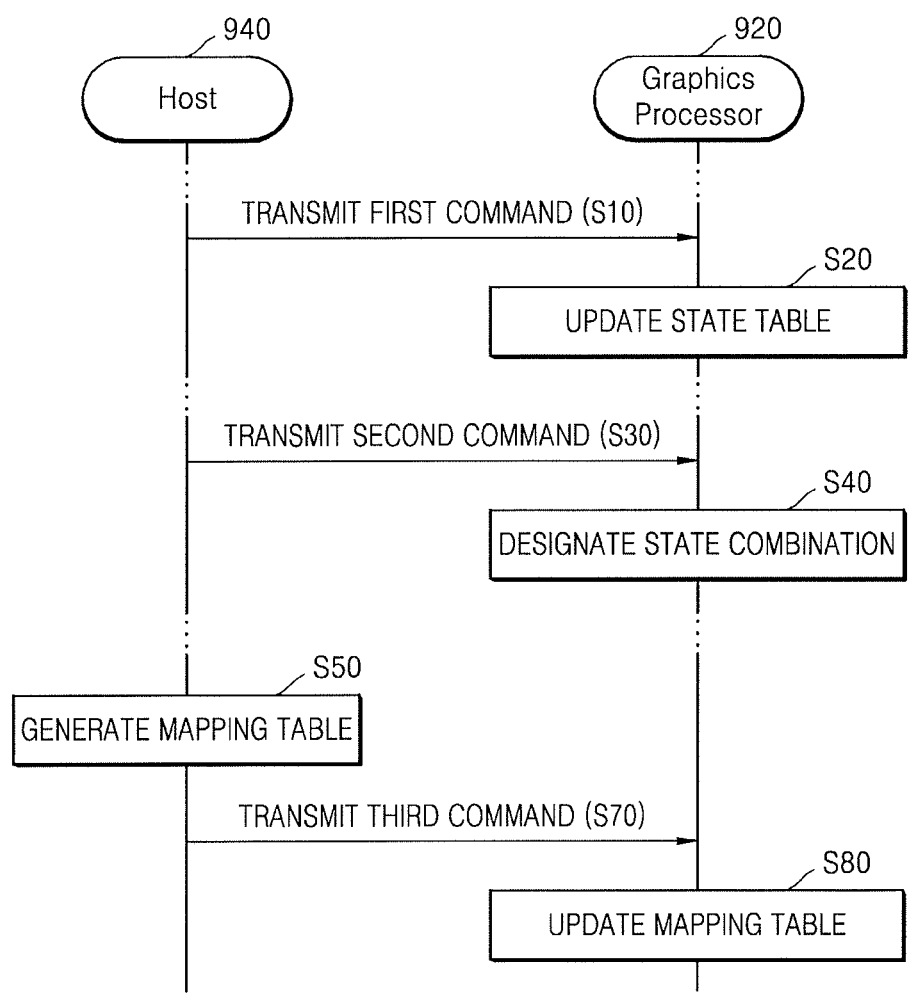
FIG. 9 illustrates a graphics processing method according to an exemplary embodiment with respect to time.

FIG. 9 illustrates a graphics processing method according to an exemplary embodiment with respect to time. A graphics processor 920 of FIG. 9 may include the elements of the graphics processor 600 of FIG. 6. Hereinafter, FIG. 9 will be described with reference to FIG. 6.

In operation S10, a host 940 may transmit a first command to the graphics processor 920. For example, the first command may accompany states to be stored in the state table 622 and may indicate an update of the state table 622. In some embodiments, the host 940 may continually transmit a plurality of first commands to the graphics processor 920, for updating a plurality of state tables respectively included in a plurality of computational units included in the graphics processor 920.

In operation S20, the graphics processor 920 may update a state table. For example, in response to the first command, the state manager 640 may change at least some of the states stored in the state table 622 of the computational unit 620 to update the state table 622. As described above, the state table 622 may include a plurality of sub-tables, and the state manager 640 may update only at least one of the plurality of sub-tables in response to the first command. An example of operation S20 will be described below with reference to FIG. 10.

In operation S30, the host 940 may transmit a second command to the graphics processor 920. For example, the second command may accompany a computational unit ID and a state version ID. As described above with reference to FIG. 5, the state table may include a plurality of sub-tables, and thus, the second command may accompany a plurality of state version IDs. As described above, the computational unit may be subdivided into sub-units.

In operation S40. the graphics processor 920 may designate a state combination. For example, the state manager 640 may designate a state combination for the plurality of sub-units SU1 to SUn included in the computational unit 620, based on the state version ID accompanied by the second command. The state combination may be defined as a combination of state versions of a plurality of sub-tables, and the state manager 640 may designate state versions of the plurality of sub-tables according to the state version ID accompanied by the second command to designate the state combination. An example of operation S40 will be described below with reference to FIG. 11. In response to the second command, the state manager 640 may designate the state combination and then may trigger an operation of the computational unit 620, and the computational unit 620 may perform a function, based on a set state.

In operation S50, the host 940 may generate the mapping table 624. For example, a GPU driver (e.g. 133 of FIG. 1) may generate a mapping table, based on a frequency of change of a state of a sub-unit. The GPU driver may generate the mapping table adaptively to an application program, thereby enhancing the performance of a graphics pipeline by the application program. An example of operation S50 will be described below with reference to FIG. 12.

In operation S70, the host 940 may transmit a third command to the graphics processor 920. For example, the third command may accompany mapping information, and the mapping information may define a correspondence relationship of fields of the state table 622 (or fields of a sub-table) and the plurality of sub-units SU1 to SUn included in the computational unit 620.

In operation S80. the graphics processor 920 may update the mapping table 624. For example. in response to the third command, the state manager 640 may change at least a portion of the mapping information stored in the mapping table 624 to update the mapping table 624. An example of operation S80 will be described below with reference to FIG. 12.

Figure 10:
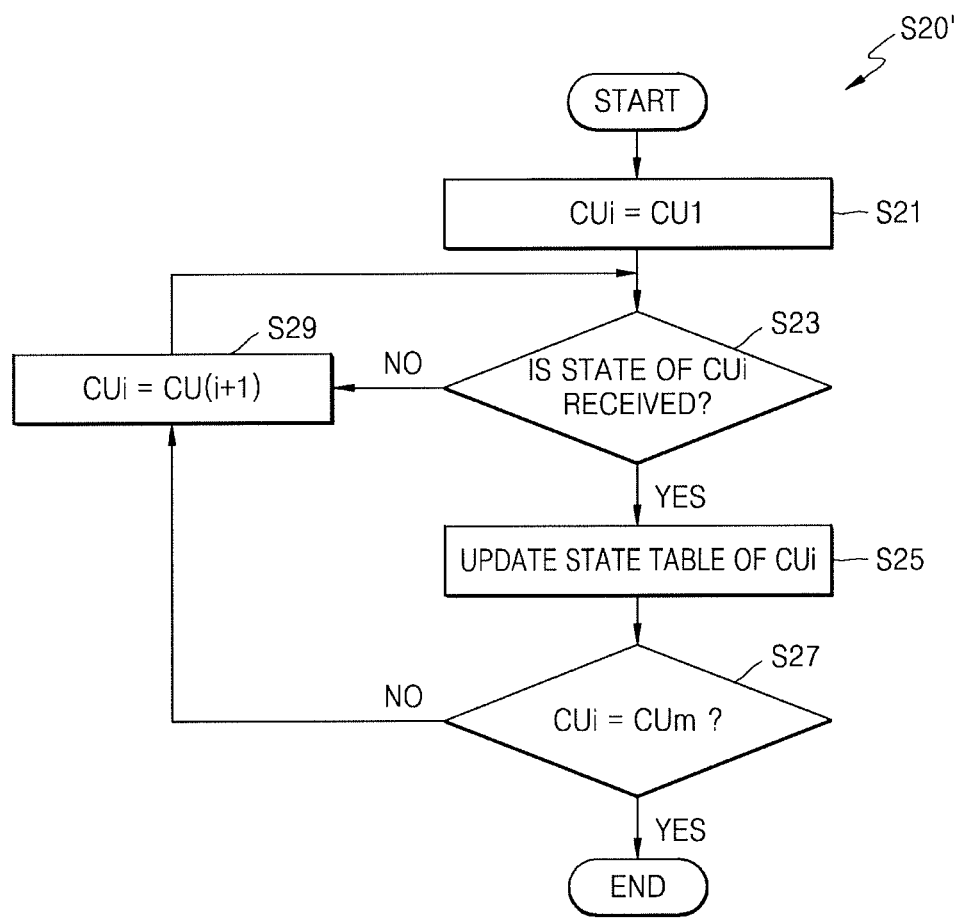
FIG. 10 illustrates a flowchart of an example of operation S20 of FIG. 9 according to an exemplary embodiment.

FIG. 10 is a flowchart illustrating an example of operation S20 of FIG. 9 according to an exemplary embodiment. As described above with reference to FIG. 9, in operation S20' of FIG. 10, an operation of updating the state table in response to the first command may be performed. As illustrated in FIG. 10, operation S20' may include operations S21, S23, S25, S27, and S29. Operation S20' of FIG. 10 may be performed by the state manager 640 of FIG. 6.

In operation S21, an $i^{th}$ computational unit CUi may be set to a first computational unit CU1. In order to determine whether to update the state table in association with all of m (where m is an integer greater than one) number of computational units included in a graphics processor in receiving the first command, the $i^{th}$ computational unit CUi may be initially set to the first computational unit CU1 (i=1).

In operation S23, whether a state of the $i^{th}$ computational unit CUi is received is checked. When the state of the $i^{th}$ computational unit CUi is received, operation S25 may be performed subsequently. On the other hand, when the state of the $i^{th}$ computational unit CUi is not received, an operation of setting the $i^{th}$ computational unit CUi to a next computational unit CU(i+1) may be performed in operation S29, and operation S23 may be performed subsequently.

In operation S25, a state table of the $i^{th}$ computational unit CUi may be updated. Only some sub-tables included in the state table may be updated according to the first command, and the state table may be wholly updated. For example, whether each of the states included in one sub-table is changed according to the first command may be determined. In this manner, an operation of determining whether a change based on the first command is performed may be sequentially performed on all sub-tables included in the state table.

In operation S27, whether the $i^{th}$ computational unit CUi is an $m^{th}$ computational unit CUm is checked. When the $i^{th}$ computational unit CUi is the $m^{th}$ computational unit CUm, operation S20' may end. When the $i^{th}$ computational unit CUi differs from the $m^{th}$ computational unit CUm, operation S29 may be performed subsequently.

Figure 11:
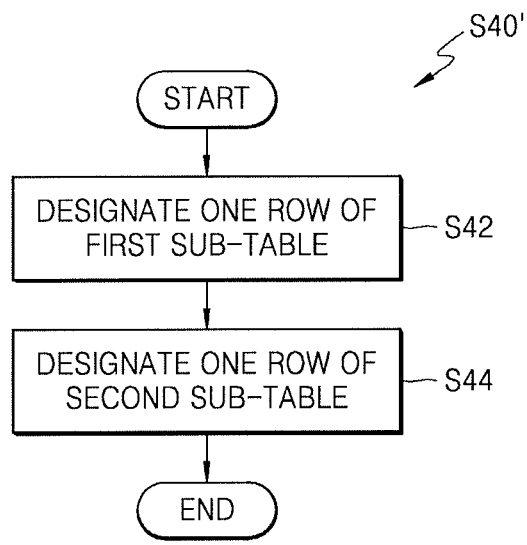
FIG. 11 illustrates a flowchart of an example of operation S40 of FIG. 9 according to an exemplary embodiment.

FIG. 11 is a flowchart illustrating an example of operation S40 of FIG. 9 according to an exemplary embodiment. As described above with reference to FIG. 9, in operation S40' of FIG. 11, designating the state combination may be performed. In detail, as in the embodiment of FIG. 5, operation S40' of FIG. 11 may represent an example which designates a state combination in a state table including two sub-tables. As illustrated in FIG. 11, operation S40' may include operation S42 and operation S44. Operation S40' of FIG. 11 may be performed by the state manager 640 of FIG. 6. Hereinafter, FIG. 11 will be described with reference to FIGS. 5 and 6.

In operation S42, an operation of designating one row of a first sub-table may be performed. For example, the state manager 640 may designate one of six rows of the first sub-table ST51. The first sub-table ST51 may store states of the first to third sub-units SU1 to SU3 to designate one row of the first sub-table ST51, and thus, the states of the first to third sub-units SU1 to SU3 may be determined.

In operation S44, one row of a second sub-table may be designated. For example, the state manager 640 may designate one of two rows of the second sub-table ST52. The second sub-table ST52 may store states of the fourth to eighth sub-units SU4 to SU8 to designate one row of the second sub-table ST52. Thus, the states of the fourth to eighth sub-units SU4 to SU8 may be determined.

When a state table includes three or more sub-tables, operations similar to operations S42 and S44 may be repeated. In this manner, in a state table including a plurality of sub-tables, a state of a computational unit may be designated by designating a row of each of the plurality of sub-tables. The plurality of sub-units SU1 to SUn may be respectively set to states designated by the state manager 640.

Figure 12:
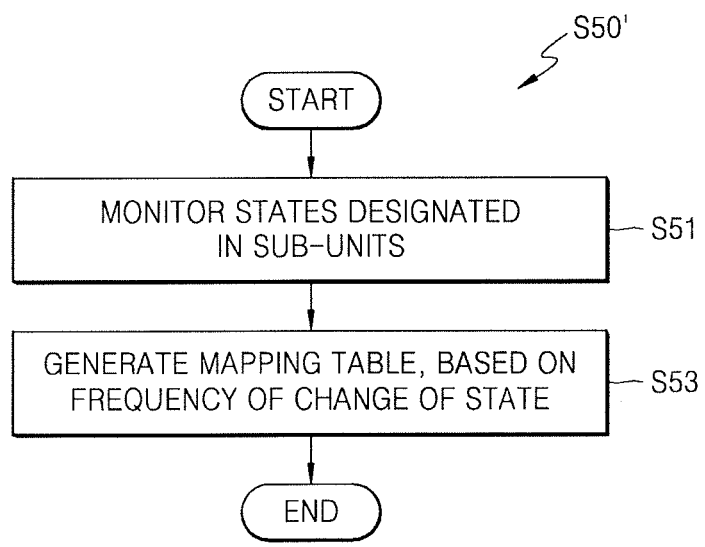
FIG. 12 illustrates a flowchart of an example of operation S50 of FIG. 9 according to an exemplary embodiment.

FIG. 12 is a flowchart illustrating an example of operation S50 of FIG. 9 according to an exemplary embodiment. As described above with reference to FIG. 9, in operation S50' of FIG. 12, the mapping table may be generated. In some embodiments, operation S50' of FIG. 12 may be performed by a GPU driver (e.g. 133 of FIG. 1) of a host. As illustrated in FIG. 12, operation S50' may include operation S51 and operation S53. Hereinafter, FIG. 12 will be described with reference to FIG. 1.

In operation S51, states designated in sub-units may be monitored. For example, as described above with reference to FIG. 8, the GPU driver 133 may generate pieces of state information to be used by the graphics processor 112 based on calls corresponding to the API 132 of the application program 131 and may monitor frequencies of changes of states used by the application program 131. In some embodiments, operation S51 may be performed in the background by a host, e.g., may be performed in parallel with operation S30 of FIG. 9.

In operation S53, the mapping table on the basis of a frequency of change of a state may be generated. For example, the GPU driver 133 may recognize a computational unit having a frequently changed state and a sub-unit having a frequently changed state, based on a result of the monitoring performed in operation S51. Therefore, the GPU driver 133 may generate the mapping table so that states, which are relatively frequently changed, of a sub-unit correspond to a sub-table including a larger number of rows and states, which are not relatively frequently changed, of a sub-unit correspond to a sub-table including a smaller number of rows.

FIG. 13 is a flowchart illustrating an example of operation S80 of FIG. 9 according to an exemplary embodiment. As described above with reference to FIG. 9, in operation S80' of FIG. 13, the mapping information may be updated. As illustrated in FIG. 13, operation S80' may include operations S81 to S83. In some embodiments, operation S80' of FIG. 13 may be performed by the state manager 640 of FIG. 6. Hereinafter, FIG. 13 will be described with reference to FIG. 6.

In operation S81, whether the mapping information is changed may be determined. For example, the state manager 640 may determine whether previous mapping information is changed based on the third command. As illustrated in FIG. 13, when the mapping information is not changed, operation S80' may end, and when the mapping information is changed, operation S83 may be performed subsequently.

In operation S83, whether a current operation ends may be determined. For example, the state manager 640 may determine whether an operation performed in each of the plurality of sub-units SU1 to SUn ends, based on previous mapping information stored in the mapping table 624. That is, when the mapping information is changed, the state manager 640 may stand by until an operation based on the previous mapping information ends, for changing the mapping information. As illustrated in FIG. 13, when a current operation ends, operation S85 may be performed subsequently.

In operation S85, the mapping information may be stored. For example, the state manager 640 may store mapping information based on the third command in the mapping table 624. Therefore, fields of the state table 622 (or fields of a sub-table) may correspond to the plurality of sub-units SU1 to SUn unlike a previous case.

FIG. 14 illustrates a graphics processor 400 according to an exemplary embodiment. As illustrated in FIG. 14, the graphics processor 400 may include a command processor 410, a pipeline controller 430, a front-end pipeline 450, a back-end pipeline 470, and a programmable processor 490.

The command processor 410 may receive a command from a host and may interpret the received command to convert the received command into a pipeline-executable command. The command processor 410 may provide a converted command to the pipeline controller 430.

The pipeline controller 430 may extract information for each of the front-end pipeline 450 and the back-end pipeline 470 from the command received from the command processor 410, and may configure a pipeline based on the extracted information. Also, the pipeline controller 430 may convert the command, received from the command processor 410, into a command executable by the front-end pipeline 450 and the back-end pipeline 470, and may provide a converted command to the front-end pipeline 450 and the back-end pipeline 470.

The front-end pipeline 450 and the back-end pipeline 470 may each include a plurality of computational units and may communicate with the programmable processor 490. As described above, a computational unit may include a state table including a plurality of sub-tables, and thus, a state may be efficiently set. The programmable processor 490, for example, may perform shading by using a shading program provided by an application program.

Embodiments provide a graphics processor and a graphics processing method, which efficiently set states of computational units included in a graphics processing system to provide a graphics pipeline with enhanced performance.

Embodiments are described, and illustrated in the drawings, in terms of functional blocks, units, modules, and/or methods. Those skilled in the art will appreciate that these blocks, units, modules, and/or methods are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, modules, and/or methods being implemented by microprocessors or similar, they may be programmed using software (e.g., microcode) to perform various functions discussed herein and may optionally be driven by firmware and/or software. Alternatively, each block, unit, module, and/or method may be implemented by dedicated hardware, or as a combination of dedicated hardware to perform some functions and a processor (e.g., one or more programmed microprocessors and associated circuitry) to perform other functions. Also, each block, unit, and/or module of the embodiments may be physically separated into two or more interacting and discrete blocks, units and/or modules without departing from the scope of the disclosure. Further, the blocks, units and/or modules of the embodiments may be physically combined into more complex blocks, units and/or modules without departing from the scope of the disclosure.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A graphics processor, comprising:
a plurality of computational units, the plurality of computational units including a first computational unit, the first computational unit including a plurality of sub-units and a state table that stores states of the plurality of sub-units; and a state manager that updates the state table in response to a first command and designates a state combination of the states stored in the state table in response to a second command, wherein the state table includes a plurality of sub-tables respectively corresponding to sub-units of the plurality of sub-units, each sub-table including a row that designates the state combination of the states for each corresponding sub-unit, and the state manager designates one row in each of the plurality of sub-tables as the state combination of the states.

2. The graphics processor as claimed in claim 1, wherein the second command includes an identifier of a computational unit and an identifier of a row of a sub-table.

3. The graphics processor as claimed in claim 1, wherein the plurality of sub-tables includes a first sub-table and a second sub-table, and a size of the first sub-table differs from a size of the second sub-table.

4. The graphics processor as claimed in claim 3, wherein number of sub-units corresponding to the first sub-table differs from number of sub-units corresponding to the second sub-table.

5. The graphics processor as claimed in claim 3, wherein number of rows in the first sub-table differs from number of rows in the second sub-table.

6. The graphics processor as claimed in claim 3, wherein the state manager updates one of the first sub-table and the second sub-table in response to the first command.

7. The graphics processor as claimed in claim 1, wherein the first computational unit further includes a mapping table to map the plurality of sub-units to the plurality of sub-tables.

8. The graphics processor as claimed in claim 7, wherein the mapping table is to map each sub-unit of the plurality of sub-units to a corresponding one of fields of the plurality of sub-tables.

9. The graphics processor as claimed in claim 7, wherein the state manager updates the mapping table in response to a third command.

10. The graphics processor as claimed in claim 1, wherein the state manager sets sizes of the plurality of sub-tables by reconfiguring the state table, in response to the first command.

11. The graphics processor as claimed in claim 1, further comprising a second computational unit including a plurality of sub-units and a state table, wherein a number of sub-tables in the state table of the first computational unit differs from a number of sub-tables in the state table of the second computational unit.

12. A graphics processor, comprising:

a plurality of computational units, the plurality of computational units including a first computational unit, the first computational unit including a plurality of sub-units and a state table that stores states of the plurality of sub-units; and a state manager that updates the state table in response to a first command and designates a state combination of the states stored in the state table in response to a second command, wherein the first computational unit further includes a mapping table that maps the plurality of sub-units to fields of the state table.

13. The graphics processor as claimed in claim 12, wherein the state manager updates the mapping table in response to a third command.

14. The graphics processor as claimed in claim 12, wherein the state table includes a first sub-table and a second sub-table each having different fields.

15. The graphics processor as claimed in claim 14, wherein a number of fields of the first sub-table differs from a number of fields of the second sub-table.

16. A graphics processing method, comprising:

in response to a first command, updating a state table storing states of a plurality of sub-units in a first computational unit, the first computational unit being one among a plurality of computational units; and in response to a second command, designating a state combination of the states stored in the state table, wherein designating the state combination of the states includes:

designating one row of a first sub-table in the state table; and designating one row of a second sub-table in the state table, wherein rows in the first and second sub-tables designate the state combination of the states for each sub-unit therein.

17. The method as claimed in claim 16, further comprising updating a mapping table for mapping each of the plurality of sub-units to the first sub-table or the second sub-table, in response to a third command.

18. The method as claimed in claim 17, further comprising:

monitoring states set in the plurality of sub-units; and generating the mapping table based on a result of monitoring.

19. The method as claimed in claim 18, wherein the first sub-table includes more rows than the second sub-table, and generating the mapping table includes mapping a sub-unit having states that change frequently to the first sub-table.

20. The method as claimed in claim 18, wherein monitoring and generating the mapping table are performed by a driver of a graphics processor.

* * * * *